United States Patent
Feng et al.

(10) Patent No.: US 7,146,442 B2
(45) Date of Patent: Dec. 5, 2006

(54) MOTHERBOARD HAVING A NON-VOLATILE MEMORY WHICH IS REPROGRAMMABLE THROUGH A VIDEO DISPLAY PORT

(75) Inventors: Eugene Feng, San Jose, CA (US); William Lau, Menlo Park, CA (US); Fong-Long Lin, Fremont, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 0 days.

(21) Appl. No.: 11/407,601

(22) Filed: Apr. 19, 2006

(65) Prior Publication Data

US 2006/0190646 A1    Aug. 24, 2006

Related U.S. Application Data

(62) Division of application No. 10/798,485, filed on Mar. 10, 2004, now Pat. No. 7,069,371.

(51) Int. Cl.
  *G06F 13/00* (2006.01)
  *G06F 3/00* (2006.01)
(52) U.S. Cl. .......................... 710/100; 713/2; 713/100
(58) Field of Classification Search ................ 710/104, 710/305; 711/103, 141, 145; 712/242; 365/185.09, 365/185.23; 375/219; 713/2; 700/87
See application file for complete search history.

(56) References Cited

U.S. PATENT DOCUMENTS

| | | | | |
|---|---|---|---|---|
| 4,443,865 A | * | 4/1984 | Schultz et al. ............... 712/242 |
| 4,975,883 A | * | 12/1990 | Baker et al. ............ 365/185.23 |
| 5,740,199 A | * | 4/1998 | Sibigtroth .................... 375/219 |
| 5,991,841 A | * | 11/1999 | Gafken et al. .............. 710/104 |
| 6,003,130 A | * | 12/1999 | Anderson ....................... 713/2 |
| 6,330,635 B1 | * | 12/2001 | Stafford ...................... 711/103 |
| 6,421,765 B1 | * | 7/2002 | Poisner ....................... 711/145 |
| 6,462,985 B1 | * | 10/2002 | Hosono et al. ......... 365/185.09 |
| 6,915,175 B1 | * | 7/2005 | Ahn ............................ 700/87 |
| 6,938,127 B1 | * | 8/2005 | Fletcher et al. ............. 711/141 |

* cited by examiner

*Primary Examiner*—Christopher E. Lee
(74) *Attorney, Agent, or Firm*—DLA Piper US LLP

(57) ABSTRACT

A motherboard of a computer system has a video display port, a reprogrammable non-volatile memory, a controller for the non-volatile memory, and a graphics controller circuit for outputting video signals to the video display port. A wired-OR circuit connects the graphics controller circuit to the controller to the port. Thus, the video display port can be used to output video signals from the computer system to a peripheral video display device, and the video display port can be used as an input port to reprogram the non-volatile memory. The present invention also relates to a non-volatile memory device which has an array of non-volatile memory cells and two ports for communication therewith. A first port receives a first communication protocol and interfaces with the array in the first communication protocol. A second port receives a second communication protocol and converts the second communication protocol into the first communication protocol.

14 Claims, 5 Drawing Sheets

Figure 1:
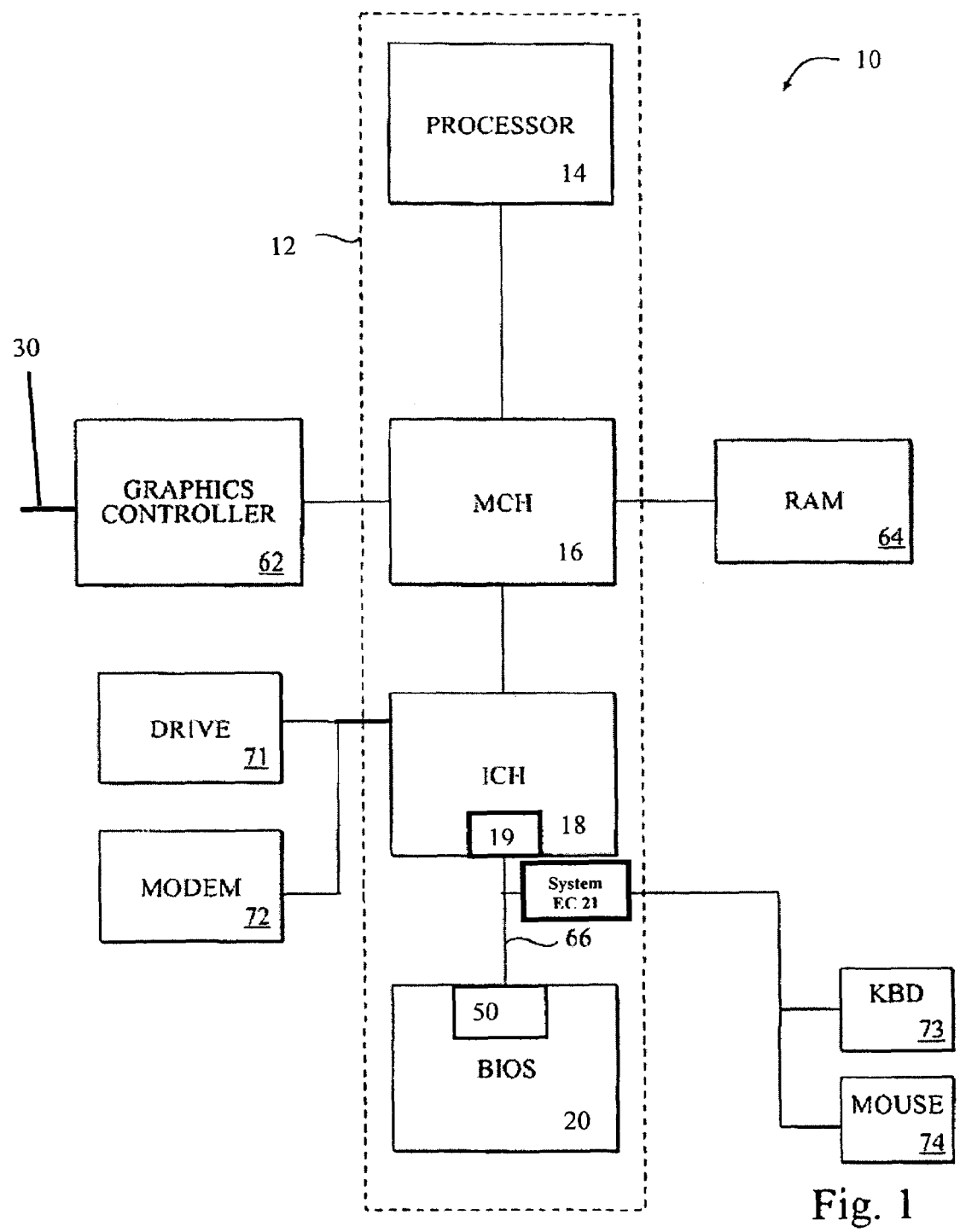

MOTHERBOARD HAVING A NON-VOLATILE MEMORY WHICH IS REPROGRAMMABLE THROUGH A VIDEO DISPLAY PORT

CROSS REFERENCE TO RELATED APPLICATIONS

This application is a divisional application of U.S. Pat. application Ser. No. 10/798,485 filed on Mar. 10, 2004, the subject matter of which is incorporated herein by reference.

TECHNICAL FIELD

The present invention is a divisional of application 10/798,485 filed on Mar. 10, 2004 now U.S. Pat. No. 7,069,371.

BACKGROUND OF THE INVENTION

Computer systems are well known in the art. In particular, a computer system adhering to the "IBM PC" standard is well known in the art. Referring to FIG. 1, there is shown a computer system 10 of the prior art. The computer system 10 conforms to the "IBM PC" architecture. The system 10 comprises typically a motherboard 12 on which are mounted a variety of components such as a processor 14, such as a Pentium microprocessor made by Intel Corporation, a memory controller hub (MCH) chip 16, and a IO controller hub (ICH) chip 18. The MCH 16 and the ICH 18 are known as chipsets and can be obtained from Intel Corporation. The motherboard 12 also comprises a BIOS memory 20 which is typically a non-volatile memory device and a system embedded controller (EC) 21 which communicates with keyboard (KB) 73 and mouse 74. The MCH chip 16 also interfaces with or may be integrated with (i.e. embedded within) a graphics controller chip 62, which outputs its video signal to a video display port 30, typically a VGA port 30 and to a video device (not shown), such as an LCD display or CRT display. The foregoing system is described and is disclosed in U.S. Pat. No. 6,421,765. See also U.S. Pat. No. 6,330,635.

Intel Corporation, a developer of the MCH chip 16, also developed the ICH chip 18 which has a particular feature known as a low pin count (LPC) bus. See, for example, U.S. Pat. No. 5,991,841. The LPC bus 66 connects the ICH chip 18 through its on-chip LPC bus interface 19 to the BIOS memory 20 (through the LPC interface 50) and the system EC 21. At the time that Intel Corporation introduced the LPC bus 66, it disclosed that the LPC bus 66 is operable in accordance with the standard as disclosed in FIG. 2. This is also disclosed in U.S. Pat. No. 5,991,841. The LPC bus 66 comprises four signal lines between the ICH chip 18 and the peripheral devices such as the BIOS memory device 20. Along the four signal lines, designated as LAD [3:0], are supplied command, data and address signals. As shown in FIG. 2, the initial field for the LAD bus is a start field. This is then followed by the address and the data signals. In addition, the LPC bus 66 has LCLK and LFRAME# control signals.

From time to time, a need arises to reprogram the BIOS memory 20 without first booting up the system, such as in the case when the entire BIOS code, including the boot code, is corrupted. However, once a computer, such as a PC is assembled, with the motherboard 12 having peripherals attached and encased, it becomes difficult to reprogram the BIOS memory 20 without disassembling the computer system. Hence there is a need to provide a mechanism by which the non-volatile memory 20 of the motherboard 12 or the computer system can be reprogrammed with ease.

SUMMARY OF THE INVENTION

In the present invention, a motherboard comprises a video display port, a reprogrammable non-volatile memory, a controller for the non-volatile memory, and a graphics controller circuit for outputting video signals to the video display port. A wired-OR circuit connects the graphics controller circuit to the controller to the port. The present invention also relates to a non-volatile memory device which comprises an array of non-volatile memory cells and two ports for communication therewith. A first port receives a first communication protocol and interfaces with the array in the first communication protocol. A second port receives a second communication protocol and converts the second communication protocol into the first communication protocol.

BRIEF DESCRIPTION OF THE DRAWINGS

FIG. 1 is a block diagram view of a computer system in accordance with the "IBM PC" architecture of the prior art.

FIG. 2 is a timing diagram showing the protocol of communication between the ICH chip 18 and the BIOS memory device 20 in accordance with the LPC protocol of the prior art.

FIG. 3 is a block diagram view of a computer motherboard in accordance with the present invention.

FIG. 4 is a detailed block diagram of a portion of the improved motherboard in the preferred embodiment of the present invention.

FIG. 5 is a schematic circuit diagram of a non-volatile memory device in the preferred embodiment of the present invention.

FIG. 6 is a timing diagram showing the protocol of an aLPC memory in a read cycle.

DETAILED DESCRIPTION OF THE INVENTION

Referring to FIG. 3 there is shown a block diagram of an improved motherboard 112 of the present invention. The improved motherboard 112 has all of the features of the motherboard 12 shown in FIG. 1, except the following. The BIOS memory 20 may be integrated with the System EC 21 and the memory 20 may then contain non-volatile memory block or blocks for both system BIOS and EC firmware storage. In addition, the motherboard 112 also comprises a serial programming interface 32 which interfaces with the non-volatile memory 20 through the LPC interface 50. Where the BIOS memory 20 is integrated with the System EC 21, the serial programming interface 32 is "wire-or" connected to the video display port 30 and is also shared between the non-volatile memory 20 and the System EC 21, as shown in FIG. 4. The serial programming interface logic circuit 32 in this preferred embodiment is a three wire bus, and as will be shown, operates very similar to the LPC bus 66.

The motherboard 112 has a video display port 30 which receives the output of an integrated MCH chip 16 and graphics controller chip 62 or simply the output of the graphics controller chip 62. In the preferred embodiment, the video display port 30 is a VGA display port 30.

The serial programming interface logic circuit 32 is connected to the output of the graphics controller chip 62 via a wired-OR circuit or a switching device at node 40. A wired-OR circuit 40 as used herein means the wires from the serial interface logic circuit 32 and the wires from the output of the graphics controller chip 62 are simply connected to one another. Where a switching device is used, it is controlled by the serial interface logic circuit 32 to connect either the serial interface signals or the output of graphics controller chip 62 to the VGA display port 30.

In the operation of the motherboard 112 in the preferred embodiment of the present invention, the output from the graphics controller 62 is supplied to the wired-OR circuit 40 and then to the video display port 30. The video signals are then supplied to a video display device (not shown), such as a CRT or LCD display. It is also well known that the system software, such as operating system (OS) needs to turn on (enable) and can also turn off (disable) the video signals that are supplied to the video display port 30. These operations are no different than the operations of the prior art. During the normal operation, the serial programming interface logic 32 internally "floats" the circuit connection to the wire-OR circuit 40, by holding the output CMOS transistors in a high impedance (HiZ) state, leaving the System EC 21 and the non-volatile memory 20 disconnected from the video port 30. The operation of the video port 30 will not be affected by the connection of the 3-wire serial programming interface circuit 32 in the high-impedance state.

In the event it is desired to program the non-volatile memory 20, the display device (not shown) is removed from being connected to the video display port 30 and the video signals is not enabled by system software to supply to the video display port 30. As is well known to those skilled in the art, to program or reprogram a non-volatile flash memory 20, commands must be first issued to erase sectors of the non-volatile memory 20. An external host programmer or external data source 42 is connected to the video display port 30. The data/program signals from the external host programmer 42 is supplied to the video display port 30 and through the wired-OR circuit 40, the signals are supplied to the serial programming interface logic 32. A particular user defined serial data stream is used as a "Key" for the serial programming interface 32 to turn it "on" and to notify the system software or to force by hardware means (for example, by writing to a register in an aLPC register space after turning on the serial programming interface 32) to restrict all access to the on-chip system non-volatile memory 20 from everything except only the serial interface logic 32 and related circuits. The signals from the serial programming interface logic 32 contain programs (or commands) and data which is provided by external host programmer 42, and controls the programming (or reprogramming) of the non-volatile memory 20.

Figure 2:
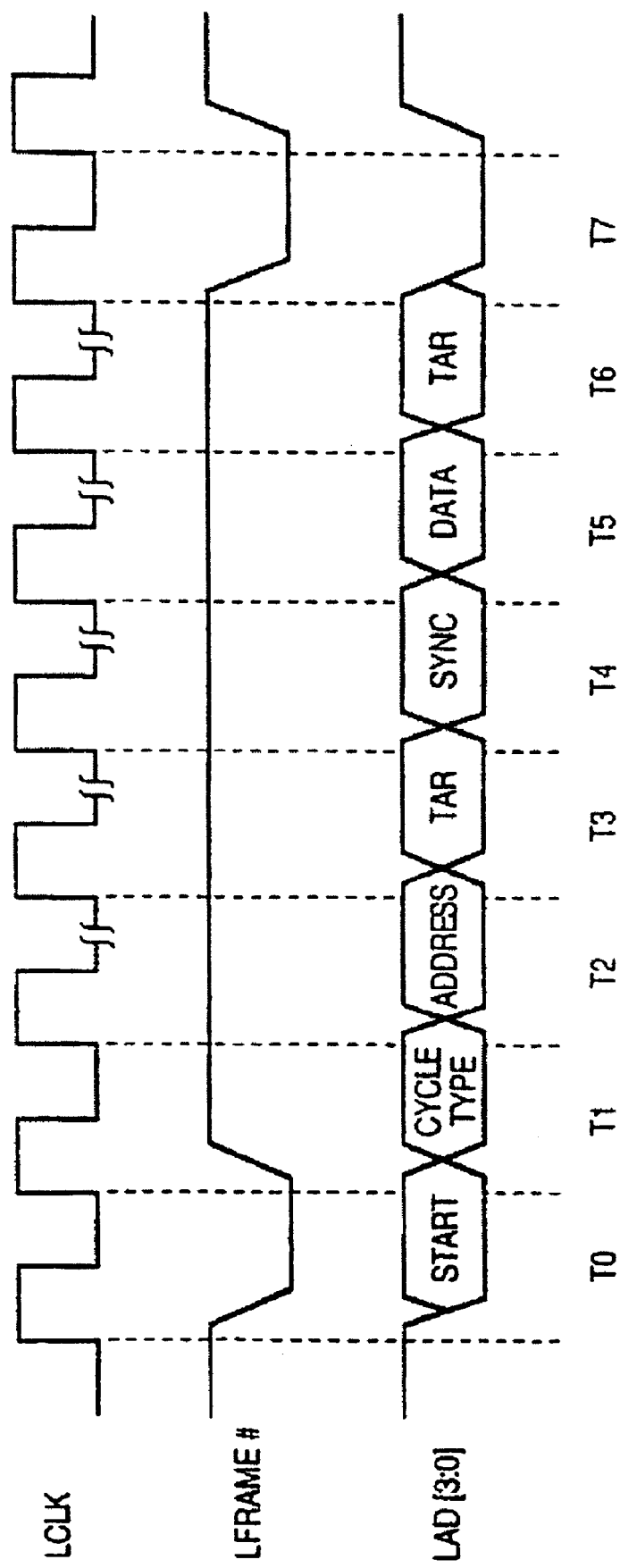
Figure 6:
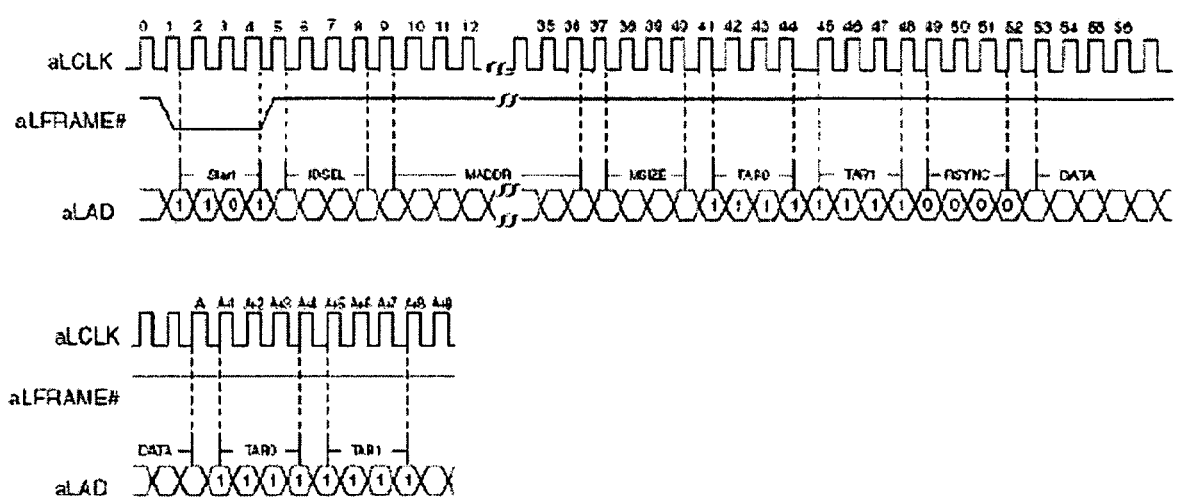

In the preferred embodiment, the communication from the external host programmer 42 to the serial programming interface logic 32 is in accordance with a protocol similar to the LPC protocol. In the LPC protocol, as shown in FIG. 2, there are four wires for data (designated as LAD[3:0]) LCLK (for clock), and LFRAME# for a total of 6 wires. The serial programming interface logic 32 has three wires for carrying clock (designated as aLCLK), framing signal (designated as aLFRAME#) and one wire for data (designated as aLAD). Thus, it takes 4 times the number of clock cycles to transmit the same number of bits, as it took to transmit in the LPC protocol. FIG. 6 shows the timing diagram of an aLPC memory operating during a read cycle. Further in the preferred embodiment, the video display port 30 is a VGA standard port. Thus, the typical VGA port 30 has the following pin functions: H-Sync, V-Sync and DDC clock, in accordance with the VGA standard. In the event an external host programmer 42 is used to reprogram the non-volatile memory 20, these VGA pins are also shared with the 3-wire serial programming interface signals from the external host programmer 42 in the following manner:

| Pin | VGA Function | Serial Programming Interface Signal |
|---|---|---|
| 1 | Red Out | |
| 2 | Green Out | |
| 3 | Blue out | |
| 4 | ID2 (GND = Color) | |
| 5 | GND (V Sync Return) | |
| 6 | GND (Red Return) | |
| 7 | GND (Green Return) | |
| 8 | GND (Blue Return) | |
| 9 | Optional +5 V | |
| 10 | GND (Sync Return) | |
| 11 | ID0 (GND = Color) | |
| 12 | ID1 (N/C = Color) | |
| 13 | Horizontal Sync Out | aLAD |
| 14 | Vertical Sync Out | aLFRAME# |
| 15 | ID3/DDC Clock | aLCLK |

If an internal host, such as an on-chip CPU or sequencer is used to reprogram the non-volatile memory 20, with the external host programmer 42 being only a source of data signals, the VGA outputs (pin #13, 14, 15) must not be active (Hi-Z) so that the VGA pins can be used to receive the data signals from the external source 42 and serve as an I/O buffer for the externally supplied serial programming interface signals. When these VGA pins (i.e. 13, 14, 15) are active, the outputs of the serial programming interface I/O buffers are disabled (Hi-Z).

Figure 3:
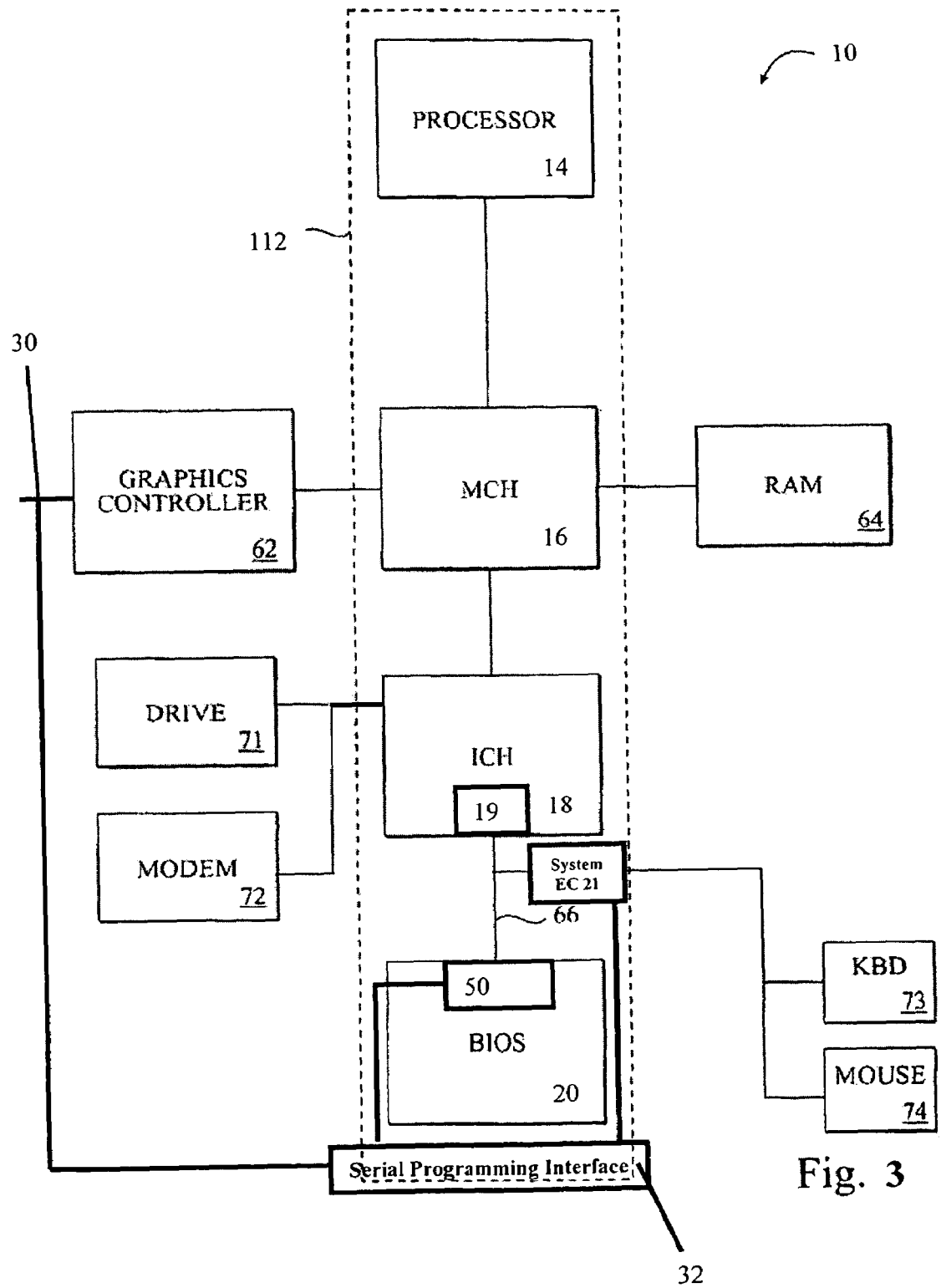
Figure 4:
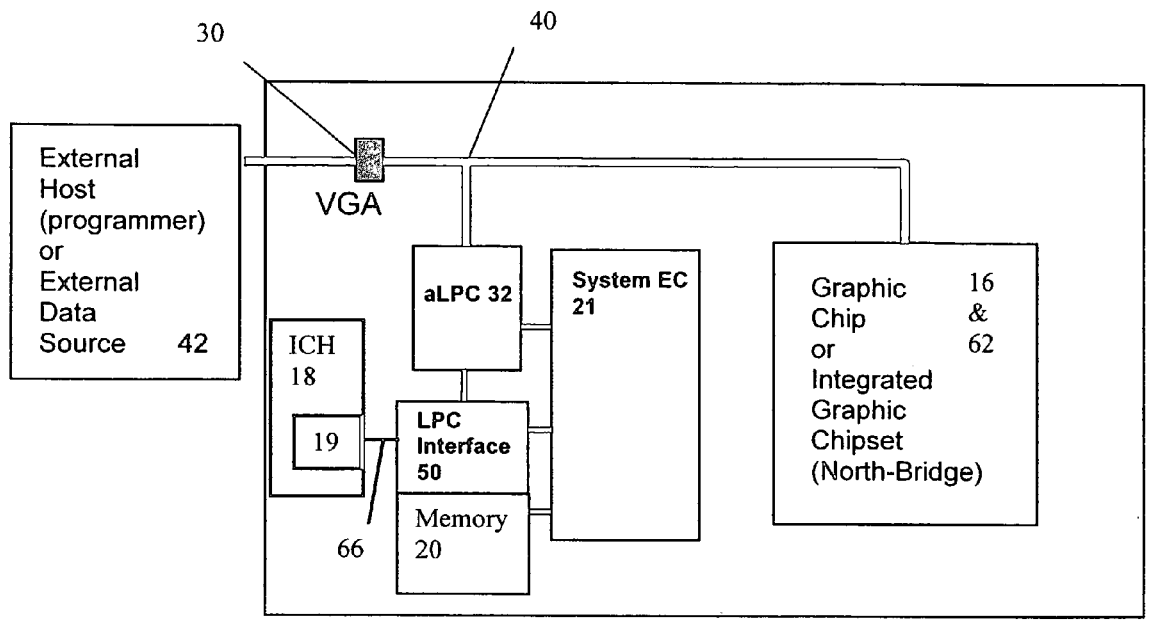
Figure 5:
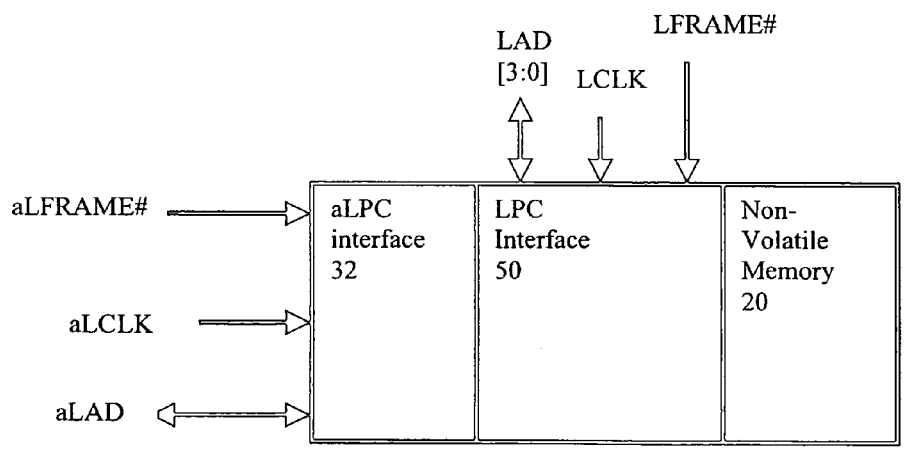

Another aspect of the present invention is shown in FIG. 5. Because the non-volatile memory 20 is accessed by both the serial programming interface logic 32 and the LPC bus 66, as shown in FIG. 3, the present invention comprises a non-volatile memory 20, having an array of non-volatile memory cells interfacing with the LPC bus 66, through an interface circuit 50. As discussed above, in the preferred embodiment, the protocol, aLPC, for communicating with the video display port 30 through the serial programming interface logic circuit 32 is a subset of the LPC communication protocol, the serial programming interface logic circuit 32 simply converts the aLPC signals into LPC signals. Since the aLCLK signal is identical to the LCLK signal, and the aLFRAME# signal is identical to the LFRAME# signal, the interface circuit 32 needs to only reconstruct the data from the circuit 32 "nibble-wise" to form the LPC data stream. The aLFRAME# is also used as a completion of erase/programming operation indication (ready/busy) to the external host 42 when the external host is not driving the aLPC bus. Thus, the automatic address increment (AAI) mode can be implemented with wait states between operations.

In an alternative embodiment, multiple aLPC interfaces 32 may be integrated and connected together. For example, multiple non-volatile memory 20, drive controller 71 and modem controller 72 are integrated into a multiple chip package or are integrated monolithically on the same semiconductor die. Each of these functions may have an associated aLPC interface 32 and are connected together internally with three pins for the external host 42. In that event, each function can have its own aLPC Identification (ID) number, similar to the LPC side protocol, for external host to select which function the command/data is targeted to.

As can be seen from the foregoing, the normal video out display port can be used to input data/program to reprogram the non-volatile memory 20 while the graphics controller 62 is either not functional or the graphics controller 62 is not driving the VGA port 30. This sharing of an output port permits the non-volatile memory 20 to be upgraded/repaired during final manufacturing board assembly stage or repaired/upgraded in the field without the need to disassemble the computer system.

What is claimed is:

1. A motherboard comprising:
   a video display port;
   a reprogrammable non-volatile memory;
   a controller for said non-volatile memory;
   a graphics controller circuit for outputting video signals; and
   a wired-OR circuit connecting said graphics controller circuit to said controller and to said port.

2. motherboard of claim 1 wherein said non-volatile memory is flash memory.

3. The motherboard of claim 2 further comprising:
   a microprocessor;
   a main memory; and wherein said flash memory for storing BIOS and controller firmware.

4. The motherboard of claim 3 wherein said controller is connected to said wired-OR circuit by a serial programming interface.

5. The motherboard of claim 4 wherein said graphics controller circuit is connected to said video display Port.

6. The motherboard of claim 5 wherein said wired-OR circuit further comprises: a VGA port circuit and the a non-volatile memory serial programming interface circuit.

7. A computer system comprising:
   a peripheral device;
   a system board coupled to the peripheral device, the system board comprising:
   a processor;
   a main memory;
   a video port;
   a graphics controller circuit;
   a non-volatile memory;
   a controller for said non-volatile memory; and
   means for connecting said graphics controller circuit to said controller and to said video port permitting signals from said graphics controller to be outputted to said video port, and permitting signals from said video port to be supplied to said controller to program said non-volatile memory.

8. The computer system of claim 7 wherein said non-volatile memory is flash memory.

9. The computer system of claim 8 wherein said flash memory for storing BIOS and firmware for said controller.

10. The computer system of claim 9 wherein said connecting means is a wired-OR circuit.

11. The computer system of claim 10 further comprising a serial programming interface, and wherein said controller is connected to said wired-OR circuit through said serial programming interface.

12. The computer system of claim 11 wherein said graphics controller circuit is connected to said video port by said wired-OR circuit.

13. The computer system of claim 7 further comprising a plurality of peripheral devices, wherein each peripheral device has an associated peripheral controller, and wherein each peripheral controller having an associated non-volatile memory and an associated serial programming interface, having a unique address.

14. The computer system of claim 13 wherein said serial programming interface associated with each peripheral controller are all connected together to said video, permitting signals from said video port to be supplied to an addressed peripheral controller to program the associated non-volatile memory.

* * * * *